(12) United States Patent
Zhang et al.

(10) Patent No.: US 8,773,608 B2
(45) Date of Patent: Jul. 8, 2014

(54) LIQUID CRYSTAL DISPLAY MODULE AND LIQUID CRYSTAL DISPLAY

(75) Inventors: Pangling Zhang, Shenzhen (CN); Yuchun Hsiao, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 268 days.

(21) Appl. No.: 13/379,285

(22) PCT Filed: Nov. 28, 2011

(86) PCT No.: PCT/CN2011/083072
§ 371 (c)(1),
(2), (4) Date: Dec. 19, 2011

(65) Prior Publication Data
US 2013/0128185 A1    May 23, 2013

(30) Foreign Application Priority Data

Nov. 18, 2011 (CN) .......................... 2011 2 0459626

(51) Int. Cl.
*G02F 1/1333* (2006.01)
(52) U.S. Cl.
USPC .............................. 349/58; 349/60

(58) Field of Classification Search
USPC ...................................... 349/58, 60
See application file for complete search history.

(56) References Cited

U.S. PATENT DOCUMENTS

| | | | |
|---|---|---|---|
| 6,392,724 B2 * | 5/2002 | An et al. | 349/58 |
| 2004/0183957 A1 * | 9/2004 | Han | 349/58 |
| 2005/0062899 A1 * | 3/2005 | Fukayama et al. | 349/58 |
| 2009/0033827 A1 * | 2/2009 | Chen et al. | 349/58 |

* cited by examiner

*Primary Examiner* — Michael Caley
(74) *Attorney, Agent, or Firm* — Mark M. Friedman

(57) ABSTRACT

The present invention discloses a liquid crystal display module having a first rubber supporting element and a second rubber supporting element used to replace a conventional elastic frame. The present invention has the following advantages and effects: because a structure of elastic frame is replaced by the rubber structures of the present invention, the cost for mold development can be reduced significantly; furthermore, comparing with pressure rivet thread posts employed in conventional techniques for positioning a light guide plate and an optical film, metal is inserted into the rubber structures of the present invention for positioning the light guide plate and the optical film, so that the cost for cutting and manufacturing of the light guide plate are reduced; at the same time, the rubber structures of the present invention can absorb a heat expansion of the light guide plate, and reduce a probability of occurrence of optical problems.

13 Claims, 3 Drawing Sheets

LIQUID CRYSTAL DISPLAY MODULE AND LIQUID CRYSTAL DISPLAY

BACKGROUND OF THE INVENTION

1. Field of Invention

The present invention relates to the field of liquid crystal display and more particularly to a liquid crystal display module and a liquid crystal display.

2. Related Art

In the wake of the development of liquid crystal display technology, the cost of liquid crystal display module is reducing gradually. A conventional liquid crystal display module comprises a front frame, a liquid crystal display panel, a plastic frame, optical films, a light guide plate, light sources, a heat dissipation plate and a back-plate, wherein the plastic frame generally requires a process of mould development, and its cost is very high.

In view of the high cost of plastic frame in conventional techniques, it is necessary to provide a liquid crystal display module to solve the problems in existing techniques.

SUMMARY OF THE INVENTION

An object of the present invention is to provide a liquid crystal display module to solve the problem of high manufacturing cost of plastic frame in existing liquid crystal display module.

In order to solve the abovementioned problem, the present invention provides a liquid crystal display module which comprises a front frame, a liquid crystal display panel, an optical film, a light guide plate and a back-plate, the front frame, the liquid crystal display panel, the optical film, the light guide plate and the back-plate are stacked with each other from the top to the bottom in turn, and it further comprises: a first rubber supporting element and a second rubber supporting element, wherein the first rubber supporting element is disposed on the second rubber supporting element, the optical film is disposed between the first rubber supporting element and the second rubber supporting element, the liquid crystal display panel is disposed on the first rubber supporting element, the second rubber supporting element is fixed on the back-plate; The first rubber supporting element defining a groove on a bottom surface thereof and a protruded column is disposed on a top surface of the second rubber supporting element corresponding to the groove; the first rubber supporting element and the second rubber supporting element are fitted together by the grooves and the protruded columns; The height of the protruded column of the second rubber supporting element is greater than the depth of the groove of the first rubber supporting element.

In the liquid crystal display module of the present invention, the second rubber supporting element is fixed by screws on the back-plate, or adhered by an adhesive on the back-plate.

In the liquid crystal display module of the present invention, a combination of the first rubber supporting element and the second rubber supporting element is disposed at one corner or more than one corner of the back-plate, and/or at edges of the back-plate.

Another object of the present invention is to provide a liquid crystal display module to solve the problem of high manufacturing cost of plastic frame in prior art.

In order to solve the abovementioned problem, the present invention provides a liquid crystal display module which comprises a front frame, a liquid crystal display panel, an optical film, a light guide plate and a back-plate, the front frame, the liquid crystal display panel, the optical film, the light guide plate and the back-plate are stacked with each other from the top to the bottom in turn, the liquid crystal display module further comprises: a first rubber supporting element and a second rubber supporting element, wherein the first rubber supporting element is disposed on the second rubber supporting element, the optical film is disposed between the first rubber supporting element and the second rubber supporting element, the liquid crystal display panel is disposed on the first rubber supporting element, and the second rubber supporting element is fixed on the back-plate.

In the liquid crystal display module of the present invention, The first rubber supporting element defining a groove on a bottom surface thereof and a protruded column is disposed on a top surface of the second rubber supporting element; and the first rubber supporting element and the second rubber supporting element are fitted together by the groove and the protruded column.

In the liquid crystal display module of the present invention, the height of the protruded column of the second rubber supporting element is greater than the depth of the groove of the first rubber supporting element.

In the foregoing liquid crystal display module, holes are disposed on the optical film which corresponding to the groove; and the holes of the optical film are fitted on the protruded columns of the second rubber supporting element.

In the foregoing liquid crystal display module, the first rubber supporting element further includes a first metal component, and the first metal component is partially or entirely inserted into the first rubber supporting element.

In the foregoing liquid crystal display module, the second rubber supporting element further includes a second metal component, and the second metal component is partially or entirely inserted into the second rubber supporting element.

In the liquid crystal display module of the present invention, the second rubber supporting element further includes a stopping wall, and the degree of rigidity of a light incident side of the stopping wall is higher than that of a non-light incident side thereof.

In the liquid crystal display module of the present invention, the second rubber supporting element is locked and fixed by screws on the back-plate, or adhered by an adhesive on the back-plate.

In the liquid crystal display module of the present invention, a combination of the first rubber supporting element and the second rubber supporting element is disposed at one corner or more than one corner of the back-plate, and/or at edges of the back-plate.

Another object of the present invention is to provide a liquid crystal display to solve the problem of high manufacturing cost of plastic frame in existing liquid crystal display module.

In order to solve the abovementioned problem, the present invention provides a liquid crystal display which comprises any one of the liquid crystal display modules mentioned above.

Advantages and effects of the present invention are that: the conventional plastic frame structure is replaced by the rubber structures employed in the present invention, because complicated moulds are required in the manufacturing of plastic frame, and the cost of mould development is accounted for a large percentage in the manufacturing costs of plastic frame, while additional mould development is not required for the manufacturing of the rubber structures, therefore the manufacturing costs can be reduced.

DETAILED DESCRIPTION OF THE INVENTION

Figure 1:
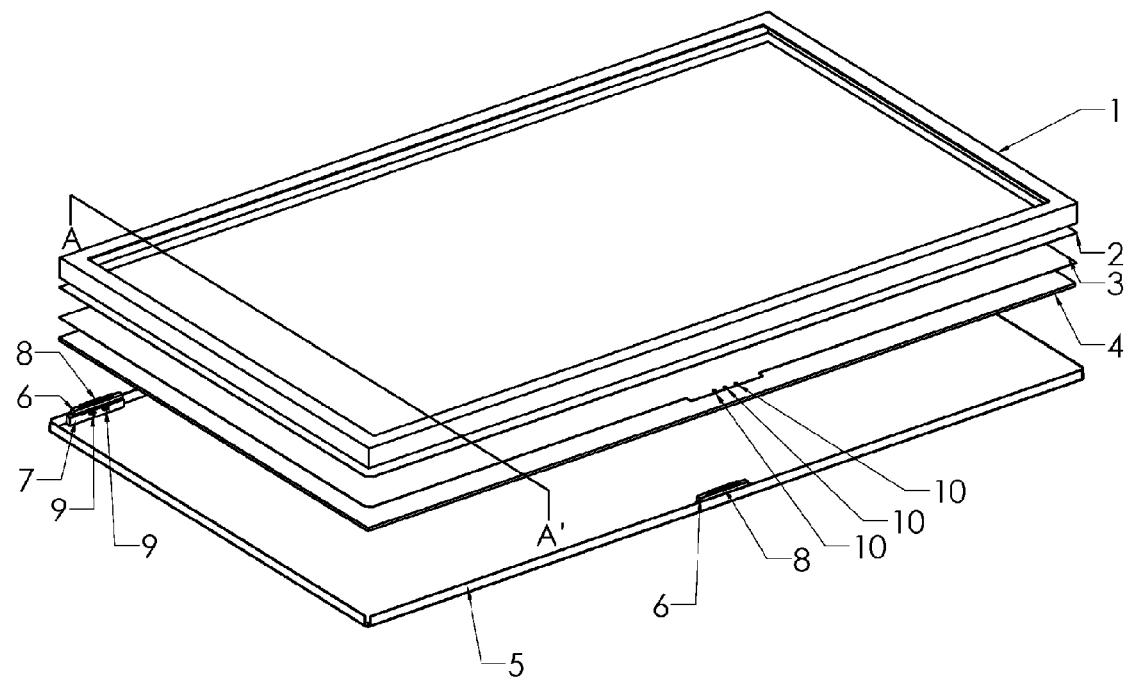
FIG. 1 is an exploded perspective view of a liquid crystal display module of the present invention.

The structure and the technical means adopted by the present invention to achieve the above and other objects can be best understood by referring to the following detailed description of the preferred embodiments and the accompanying drawings. Moreover, the following terms mentioned in the present invention, for instances, upper, lower, front, rear, left, right, inside, outside, lateral side, etc, are for directions in connection with the figures attached. Therefore, these direction terms are used to explain and help to comprehend the present invention, but not as limitations thereof.

In the drawings, units with similar structures are illustrated by the same numerals.

Figure 2:
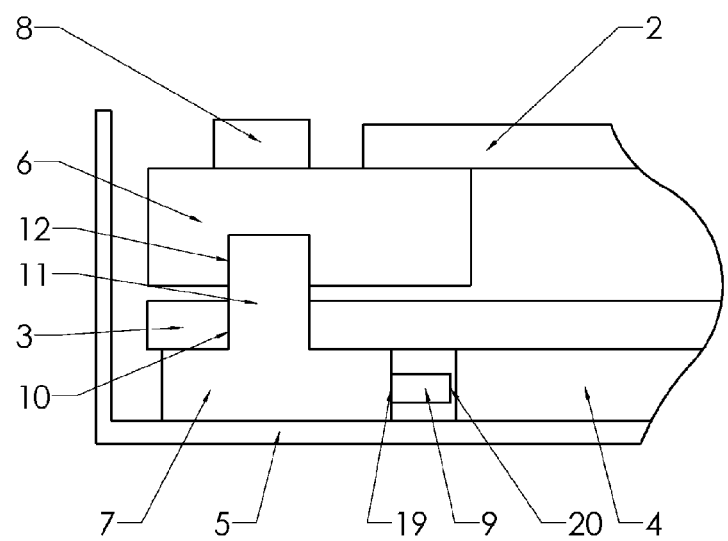
FIG. 2 is a partial and cross-sectional view of FIG. 1 taken along a cross-sectional line A-A' thereof.

Referring to FIGS. 1 and 2, FIG. 1 is an exploded perspective view of a liquid crystal display module of the present invention, FIG. 2 is a partial and cross-sectional view of FIG. 1 taken along a cross-sectional line A-A' thereof.

A liquid crystal display module of the present invention comprises a front frame 1, a liquid crystal display panel 2, an optical film 3, a light guide plate 4 and a back-plate 5; wherein the front frame 1, the liquid crystal display panel 2, the optical film 3, the light guide plate 4 and the back-plate 5 are stacked with each other from the top to the bottom in turn. A combination of a first rubber supporting element 6 and a second rubber supporting element 7 is disposed at an edge of the back-plate 5, more specifically, the combination of the first rubber supporting element 6 and the second rubber supporting element 7 can be disposed at one corner or more than one corner of the back-plate 5, and/or at the edges of the back-plate 5 according to requirements. Holes 10 are disposed on the optical film 3 which corresponding to the grooves 12. The optical film 3 is disposed between the first rubber supporting element 6 and the second rubber supporting element 7, the liquid crystal display panel 2 is disposed on the first rubber supporting element 6. The protruded columns 11 of the second rubber supporting element 7 are fitted in the holes 10 of the optical film 3, so that the optical film 3 can be positioned by the protruded columns 11.

The first rubber supporting element 6 and the second rubber supporting element 7 can be made of rubber, or partly rubber, or partly metal and/or plastic. Referring to FIG. 2, the first rubber supporting element 6 is disposed on the second rubber supporting element 7, more specifically, the first rubber supporting element 6 and the second rubber supporting element 7 are fitted together by the grooves 12 of the first rubber supporting element 6 and the protruded columns 11 of the second rubber supporting element 7.

In the present invention, the conventional plastic frame structure is replaced by the rubber structures employed in the present invention, because complicated moulds are required in the manufacturing of plastic frame, and the cost of mould development is accounted for a large percentage in the manufacturing costs of plastic frame, while additional mould development is not required for the manufacturing of the rubber structures, therefore the manufacturing costs can be reduced substantially.

Furthermore, a supporting platform 8 is disposed on the first rubber supporting element 6 for supporting the front frame 1 and positioning the liquid crystal display panel 2. The second rubber supporting element 7 is fixed on the back-plate 5. After the first rubber supporting element 6 and the second rubber supporting element 7 are fitted together, an adhesive or screws can be used to adhere or lock the first rubber supporting element 6 on lateral sides or edges of the back-plate 5.

Furthermore, the height of the protruded column 11 of the second rubber supporting element 7 is greater than the depth of the groove 12 of the first rubber supporting element 6, more specifically, the height of the protruded column 11 of the second rubber supporting element 7 is greater than a sum of the depth of the groove 12 of the first rubber supporting element 6 and the thickness of the optical film 3. Therefore, a gap is formed between a bottom surface of the first rubber supporting element 6 and a top surface of the second rubber supporting element 7, when the optical film 3 is disposed between the first rubber supporting element 6 and the second rubber supporting element 7, a space is provided by the gap for a heat expansion of the optical film 3. The conventional plastic frame structure is replaced by the rubber structures employed in the present invention, therefore the costs of mould development can be reduced substantially. At the same time, the first rubber supporting element and the second rubber supporting element of the present invention are used to absorb a heat expansion of the light guide plate and reduce a probability of occurrence of optical problems.

Wherein, the height of the protruded column 11 of the second rubber supporting element 7 is a value of a distance between a top of the protruded column 11 and a top surface of the second rubber supporting element 7; the depth of the groove 12 of the first rubber supporting element 6 is a value of a distance between a bottom surface (an innermost surface of the groove 12) of the groove 12 and a bottom surface of the first rubber supporting element 6. Holes 10 are further disposed on the optical film 3, the number, the shape and positions of the holes 10 are corresponding to the number, the shape and positions of the protruded columns 11 of the second rubber supporting element 7 respectively. Thereby, the optical film 3 can be positioned by the second rubber supporting element 7, and the optical film 3 will not be offset easily from its position. The liquid crystal display panel 2 is disposed on the first rubber supporting element 6. A supporting platform 8 is disposed on a top surface of the first rubber supporting element 6 for supporting the front frame 1 in order to prevent an acting force exerted on the liquid crystal display panel 2 by the front frame 1, and the liquid crystal display panel 2 may even be damaged by the acting force, and for positioning the liquid crystal display panel 2, thereby the liquid crystal display panel 2 can be conveniently assembled. A stopping wall 9 is disposed on a lateral side of the second rubber supporting element 7 facing the light guide plate 4 for supporting the light guide plate 4. The first rubber supporting element 6 and the second rubber supporting element 7 can be locked together by screws, or can be adhered together by an adhesive. The first rubber supporting element 6, or the second rubber supporting element 7, or both of them can be fixed on the back-plate 5 by screws or an adhesive.

Furthermore, a degree of rigidity of a light incident side 19 (i.e. the second rubber supporting element 7) of the stopping wall 9 of the second rubber supporting element 7 is higher than that of a non-light incident side 20, thereby, a distance of light coupling between the light guide plate 4 and a light source can be ensured when the light guide plate 4 is expanded under heat. More specifically, a rubber block with a higher degree of rigidity can be placed at the light incident side 19 and have it fixed together with the second rubber supporting element 7, or a chemical such as polyvinyl chloride (PVC) or fortified styrene can be used at the light incident side 19 of the second rubber supporting element 7 to enhance a degree of rigidity of rubber. Comparing with using pressure rivet thread posts in conventional techniques to fix the light guide plate and the optical film, metal is inserted into the rubber structures by using the stopping wall 9 in the present invention for positioning the light guide plate, the optical film 3 is positioned by the second rubber supporting element 7, and the costs of cutting and rivet pressing of the light guide plate can also be reduced by the optical film.

Figure 3:
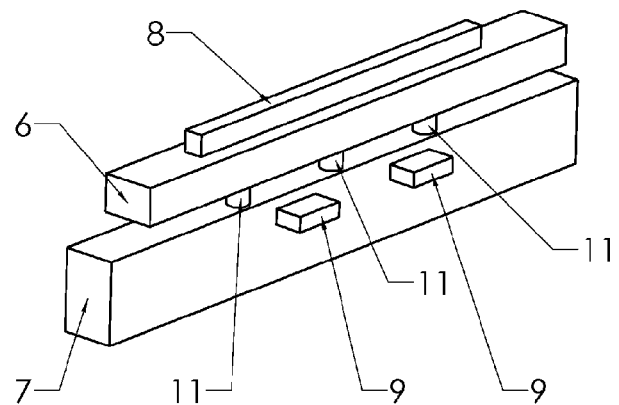
FIG. 3 is an assembly illustration of a first rubber supporting element and a second rubber supporting element of the liquid crystal display module of the present invention.
Figure 4:
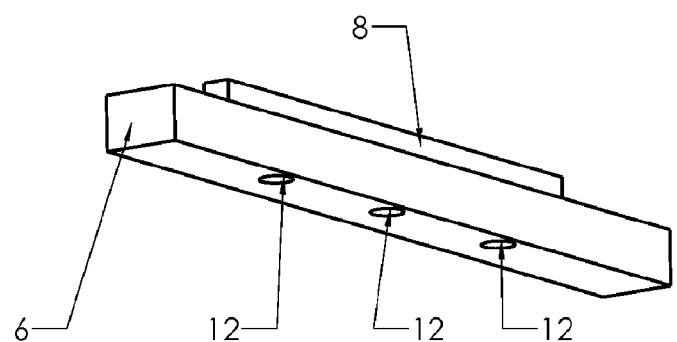
FIG. 4 is a perspective view of the first rubber supporting element of the liquid crystal display module of the present invention.
Figure 5:
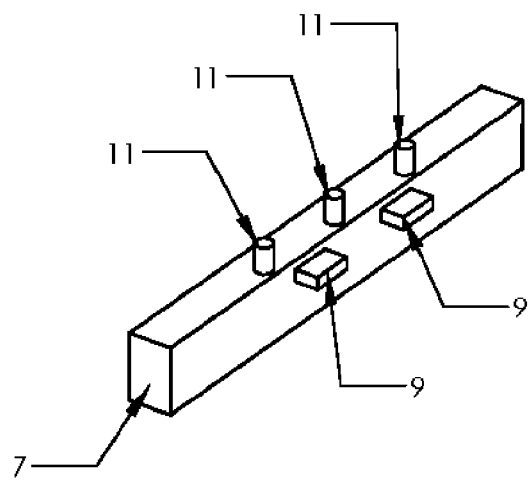
FIG. 5 is a perspective view of the second rubber supporting element of the liquid crystal display module of the present invention.

Referring to FIGS. 3, 4 and 5, FIG. 3 is an assembly illustration of the first rubber supporting element 6 and the second rubber supporting element 7 of the liquid crystal display module of the present invention, FIG. 4 is a perspective view of the first rubber supporting element 6 of the liquid crystal display module of the present invention, and FIG. 5 is a perspective view of the second rubber supporting element 7 of the liquid crystal display module of the present invention.

The first rubber supporting element 6 is disposed on the second rubber supporting element 7, the first rubber supporting element 6 and the second rubber supporting element 7 are fitted together by using the grooves 12 and the protruded columns 11. In this embodiment, the protruded columns 11 of the second rubber supporting element 7 are cylindrical, while the cross-sectional surface of the grooves 12 of the first rubber supporting element 6 is circular. The size of the cross-sectional surface of the protruded columns 11 is in accordance with the size of the cross-sectional surface of the grooves 12. The shape of the cross-sectional surface of the grooves 12 of the first rubber supporting element 6 and the shape of the cross-sectional surface of the protruded columns 11 of the second rubber supporting element 7 can be other regular shapes or irregular shapes, as long as they are corresponding with each other. The height of the protruded column 11 of the second rubber supporting element 7 is greater than the depth of the groove 12 of the first rubber supporting element 6. More specifically, the height of the protruded column 11 is greater than a sum of the depth of the groove 12 and the thickness of the optical film 3, the height of the protruded column 11 is a distance between a top of the protruded column 11 and a bottom (the top surface of the second rubber supporting element 7) of the protruded column 11; the depth of the groove 12 is a distance between a bottom surface (an innermost surface) of the groove 12 and a bottom surface of the first rubber supporting element 6. Thereby, the optical film 3 can be positioned by using the protruded columns 11, and a space is reserved for a heat expansion of the optical film 3.

Figure 6:
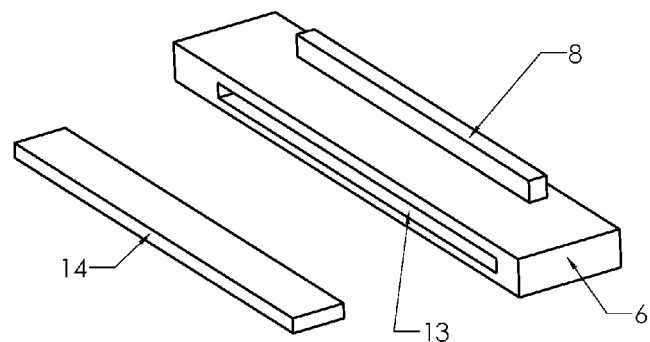
FIG. 6 is an exploded perspective view of a first improved rubber supporting element.

FIG. 6 is an exploded perspective view of the first improved rubber supporting element 6.

A first opening 13 is disposed on a lateral side of the first rubber supporting element 6, the first opening 13 is for a first metal component 14 to be inserted into, a shape of the first opening 13 corresponds to a shape of a cross-sectional surface of the first metal component 14, in this embodiment, the first metal component 14 is a piece of metal. The first metal component 14 can be partially inserted into the first rubber supporting element 6, and can also be entirely inserted into the first rubber supporting element 6. Certainly, a plurality of metal components can be inserted into the lateral sides of the first rubber supporting element 6. Strength of the first rubber supporting element 6 can be enhanced by having the first metal component 14 inserted into the first rubber supporting element 6.

In the present invention, because the light guide plate and the optical film can be positioned by inserting metal into the rubber structures, thus cutting and rivet pressing of the light guide plate are not required for positioning the light guide plate, manufacturing procedures can be reduced and the costs of cutting and rivet pressing of the light guide plate can also be reduced.

In the liquid crystal display module of the present invention, conventional plastic frame is replaced by the first rubber supporting element 6 and the second rubber supporting element 7, thus the costs of mould development for plastic frame of the liquid crystal display module can be reduced substantially. The second rubber supporting element 7 is fixed on the back-plate 5, wherein the protruded columns 11 are disposed on the second rubber supporting element 7, the optical film 3 is disposed on the top surface of the second rubber supporting element 7 and the holes 10 on the optical film 3 are fitted on the protruded columns 11, thereby, the optical film 3 can be supported stably and can also be positioned precisely; the first rubber supporting element 6 is fitted on the second rubber supporting element 7, when the first rubber supporting element 6 is fixed on the back-plate 5 or the second rubber supporting element 7, and even when a pressure (a pressure exerted on the first rubber supporting element 6 and the second rubber supporting element 7 by the front frame 1 when it is placed above them) is exerted on the supporting platform 8 of the first rubber supporting element 6 by the front frame 1, the optical film 3 can still be locked securely by a combination of the first rubber supporting element 6 and the second rubber supporting element 7, thus the optical film 3 can be prevented from offsetting from its position (especially when the liquid crystal display module is moved or during a process of transportation), so that a quality of the entire set of liquid crystal display module can be ensured. Furthermore, a space between the first rubber supporting element 6 and the second rubber supporting element 7 is reserved for a heat expansion of the optical film 3, thereby, the optical film 3 will not get damaged from being compressed. A pressure exerted on the liquid crystal display panel 2 by the front frame 1 is shared by the supporting platform 8 of the first rubber supporting element 6, so that a display quality of the liquid crystal display panel 2 can be prevented from being affected due to the compression, or the liquid crystal display panel 2 itself can be prevented from being damaged. The light guide plate 4 can be positioned by the stopping wall 9 of the second rubber supporting element 7.

Figure 7:
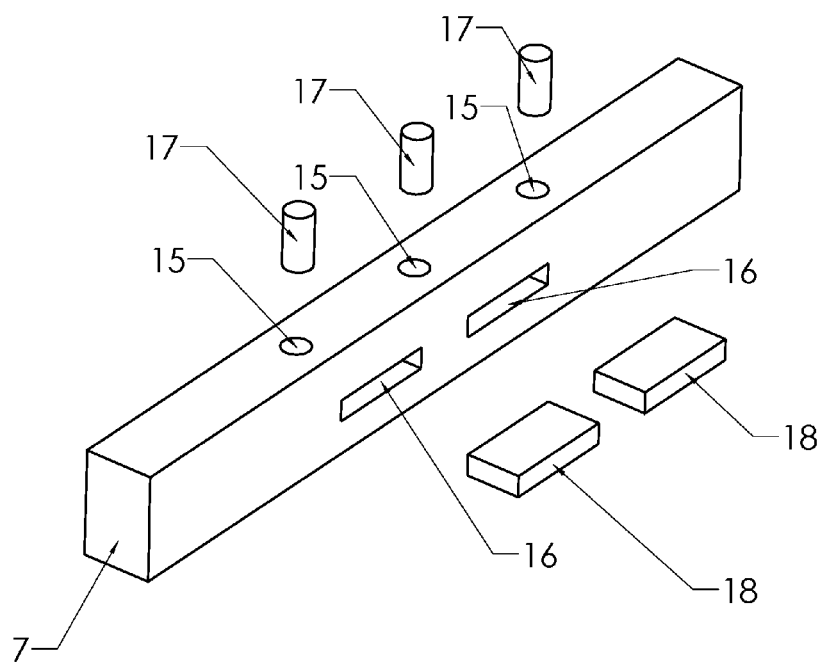
FIG. 7 is an exploded perspective view of a second improved rubber supporting element.

FIG. 7 is an exploded perspective view of the second improved rubber supporting element 7.

A plurality of second openings 15 and a plurality of third openings 16 are disposed on the second rubber supporting element 7, the second openings 15 are disposed on the top surface of the second rubber supporting element 7, the third openings 16 are disposed on a lateral surface of the second rubber supporting element 7, the second openings 15 and the third openings 16 are used for inserting second metal components 17 and third metal components 18 respectively. The second metal components 17 and the third metal components 18 can be partially inserted into the second rubber supporting element 7. Strength of the second rubber supporting element 7 can be enhanced by having the metal components inserted into the second rubber supporting element 7.

In this embodiment, a manufacturing method of the first rubber supporting element 6 and the second rubber supporting element 7 includes:

step 1: preparing a piece of rubber in a cuboid shape;

step 2: cutting on a middle part of the rubber piece along its longitudinal direction, so that the rubber piece is cut into two sub-pieces, namely a first sub-piece and a second sub-piece, respectively;

step 3: determining positions, quantity and shape of protruded columns and grooves;

step 4: cutting on a top surface of the first sub-piece to form a supporting platform 8, certainly, another rubber piece can be adhered on the top surface of the first sub-piece by an adhesive to form the supporting platform 8;

step 5: drilling or cutting on a bottom surface of the first sub-piece to form first grooves 12;

step 6: cutting on a lateral surface of the first sub-piece to form a first opening 13;

step 7: inserting a metal piece 14 (the first metal component 14) into the first opening 13;

step 8: drilling or cutting on a top surface of the second sub-piece to form second grooves 15 (the second openings 15) corresponding to the first grooves 12;

step 9: cutting on a lateral surface of the second sub-piece to form third openings 16;

step 10: inserting cylindrical metal pieces 17 partially into the second grooves 15, parts protruded outside the second grooves 15 are formed as protruded columns 11, inserting metal pieces 18 partially into the third openings 16, parts protruded outside the third openings 16 are formed as stopping walls 9; and step 11: fitting the first sub-piece and the second sub-piece together by the first grooves 12 and the cylindrical metal pieces 17.

A sequence of the steps 4 to 10 can be adjusted according to requirements. The steps 1 and 2 can be changed to: preparing two pieces of rubber in a cuboid shape as a first sub-piece and a second sub-piece, respectively.

The present invention has been described with preferred embodiments thereof and it is understood that many changes and modifications to the described embodiments can be carried out without departing from the scope and the spirit of the invention that is intended to be limited only by the appended claims.

What is claimed is:

1. A liquid crystal display module, comprising a front frame, a liquid crystal display panel, an optical film, a light guide plate and a back-plate, the front frame, the liquid crystal display panel, the optical film, the light guide plate and the back-plate being stacked with each other from top to bottom in turn, characterized in that: further comprising:

a first rubber supporting element and a second rubber supporting element, the first rubber supporting element being disposed on the second rubber supporting element, the optical film being disposed between the first rubber supporting element and the second rubber supporting element, the liquid crystal display panel being disposed on the first rubber supporting element, and the second rubber supporting element being fixed on the back-plate;

the first rubber supporting element defining a groove in a bottom surface thereof, and a protruded column being disposed on a top surface of the second rubber supporting element corresponding to the groove;

wherein the first rubber supporting element and the second rubber supporting element are fitted together by the groove and the protruded column; and wherein the height of the protruded column of the second rubber supporting element is greater than the depth of the groove of the first rubber supporting element;

wherein a first opening is disposed on a lateral side of the first rubber supporting element, and the first opening is for a first metal component to be inserted into, so that the strength of the first rubber supporting element is enhanced.

2. The liquid crystal display module as claimed in claim 1, characterized in that: the second rubber supporting element is fixed on the back-plate by screws, or adhered on the back-plate.

3. The liquid crystal display module as claimed in claim 1, characterized in that: a combination of the first rubber supporting element and the second rubber supporting element is disposed at one corner or more than one corner of the back-plate, and/or at edges of the back-plate.

4. A liquid crystal display module, comprising a front frame, a liquid crystal display panel, an optical film, a light guide plate and a back-plate, the front frame, the liquid crystal display panel, the optical film, the light guide plate and the back-plate being stacked with each other from top to bottom in turn, characterized in that: further comprising:

a first rubber supporting element and a second rubber supporting element, the first rubber supporting element being disposed on the second rubber supporting element, the optical film being disposed between the first rubber supporting element and the second rubber supporting element, the liquid crystal display panel being disposed on the first rubber supporting element, and the second rubber supporting element being fixed on the back-plate;

wherein a first opening is disposed on a lateral side of the first rubber supporting element, and the first opening is for a first metal component to be inserted into, so that the strength of the first rubber supporting element is enhanced.

5. The liquid crystal display module as claimed in claim 4, characterized in that: grooves are disposed on a bottom surface of the first rubber supporting element, and protruded columns are disposed on a top surface of the second rubber supporting element; and the first rubber supporting element and the second rubber supporting element are fitted together by the groove and the protruded column.

6. The liquid crystal display module as claimed in claim 4, characterized in that: the height of the protruded column of the second rubber supporting element is greater than the depth of the groove of the first rubber supporting element.

7. The liquid crystal display module as claimed in claim 4, characterized in that: holes are disposed on the optical film and are corresponding to the grooves of the first rubber supporting element; and the holes of the optical film are fitted on the protruded columns of the second rubber supporting element.

8. The liquid crystal display module as claimed in claim 7, characterized in that: the first rubber supporting element further includes a first metal component, and the first metal component is partially or entirely inserted into the first rubber supporting element.

9. The liquid crystal display module as claimed in claim 8, characterized in that: the second rubber supporting element further includes a second metal component, and the second metal component is partially or entirely inserted into the second rubber supporting element.

10. The liquid crystal display module as claimed in claim 4, characterized in that: the second rubber supporting element further includes a stopping wall, and the degree of rigidity of a light incident side of the stopping wall is higher than that of a non-light incident side thereof.

11. The liquid crystal display module as claimed in claim 4, characterized in that: the second rubber supporting element is locked and fixed by screws on the back-plate, or adhered by an adhesive on the back-plate.

12. The liquid crystal display module as claimed in claim 4, characterized in that: a combination of the first rubber supporting element and the second rubber supporting element is disposed at one corner or more than one corner of the back-plate, and/or at edges of the back-plate.

13. A liquid crystal display, characterized in that: comprising a liquid crystal display module as claimed in claim 4.

* * * * *